Jan. 30, 1968  HIROSHI KOMADA  3,366,718

MANUFACTURING METHOD OF FOAMED PLASTIC PIPES

Filed June 22, 1964

Hiroshi Komada
INVENTOR.

BY Wenderoth,
Lind and Ponack,
attorneys

United States Patent Office 3,366,718
Patented Jan. 30, 1968

3,366,718
MANUFACTURING METHOD OF FOAMED
PLASTIC PIPES
Hiroshi Komada, Ibaraki, Osaka, Japan, assignor to The
Toyo Rubber Industry Co., Ltd., Osaka, Japan, a corporation of Japan
Filed June 22, 1964, Ser. No. 376,629
Claims priority, application Japan, July 23, 1963,
38/39,407
6 Claims. (Cl. 264—45)

ABSTRACT OF THE DISCLOSURE

A method of making a foamed plastic pipe, comprising the steps of providing a core cylinder having a diameter corresponding to the internal diameter of the pipe to be made, a base for said core cylinder having an outside diameter corresponding to the outside diameter of the pipe to be made, positioning said core and base in a vertical position on a horizontal rotating platform, positioning a flexible cylindrical outer mold member around the periphery of said base and coaxial with said core cylinder, placing a rotatable roller having a length as long as the vertical dimension of the outer mold member against one side of said outer mold member, and while rotating said platform for rotating the mold core, base and outer member and causing the rotation of said roller by its contact with the outer mold member, continuously pouring a quick foaming fast curing plastic material into the space between said core and said outer mold member from a fixed point above said space and at a rate which will permit completion of foaming and the top surface of the plastic material to gel before the next portion of plastic material is poured onto it.

---

Figure 1:
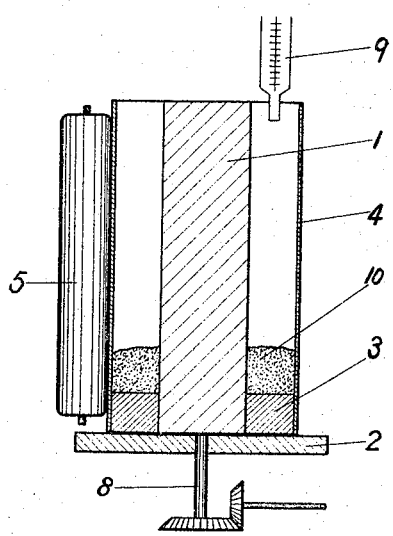

This invention relates to a manufacturing method of a pipe made of foamed plastic (meaning polyurethane resin, epoxy resin, etc.), particularly a thermo insulating cylinder, etc. For the advantages of excellent insulation, lightweight and simplicity of required work, various kinds of foamed plastic pipes, particularly pipes of urethane resin, are being required in mounting quantities as thermo insulating cylinders.

A variety of methods are possible for manufacturing these foamed plastic pipe insulating cylinders. These methods may be broadly classified into the molding methods and the cutting methods in which they are cut out from slab-shaped planed or ground sheets.

The latter method is not necessarily preferable since it involves quite a number of processing steps and a great loss of materials.

The molding method, on the other hand, is one conventionally executed, but has the disadvantages that the shapes of the product obtained by the method range over more than 100 kinds, especially in the manufacture of insulating cylinders etc., and, besides, scores of similar molds have to be prepared during the processes, which, as is obvious, causes a great amount of trouble as well as expenses.

From another point of view, moreover, in the plasticization of plastics, e.g., polyurethane foam, epoxy foam, etc., which may be foamed and molded under the conditions nearly of a temperature near room temperature and ordinary pressure, the molding method, such as is described above, does not produce a product which does full justice to the characteristic properties of those plastics.

In case, however, of the product of this invention, where pouring and foaming are carried out simultaneously along the entire length of the height which is rather large in proportion to the sectional area thereof, the foaming pressure at each height will cause a considerable pressure in the lowermost portion.

Accordingly, it is impossible to mold objects of these shapes in a longitudinal mold, unless the mold is provided with a considerable pressure-resisting strength, while the foaming effected will unavoidably lack uniformity.

The present invention dispenses with all of these conventional defects, troubles and expenses required for preparing a great number of molds, as referred to above, while there is practically no loss of materials, and, at the same time, the pressure in the bottom part may be reduced so that uniform vesication may be effected. Thus, the present invention provides a method of manufacturing foamed plastic pipes by means of a novel longitudinal mold-pouring process.

In the present invention, the foaming plastic material, the foam-completing speed of which is regulated so as to be more or less quick, is used, and, the relation between the amount poured (which is limited to a small quantity) and the revolving speed of the rotating disc is appropriately regulated, and, by repeating the process of pouring and foaming continuously (the so-called process of cumulative foaming), the foaming pressure is reduced by a large margin.

The foamable liquid employed is generally prepared so that it is fast-curing in order to prevent penetration of the newly poured liquid into previously poured partly-gelled foam. It is thus possible to accumulate the poured liquid immediately, and continuously on the top of the previously poured foam. Thus, continuous cumulative foaming is carried out by introducing successively such liquid into the mold cavity. The amount poured can be controlled so that it is in proportion to the sectional area of the cavity and the appropriate pouring velocity can be experimentally decided.

Accordingly, it is possible to fill up a cavity of great height over the whole sectional area thereof by a continuous pouring procedure. The foaming pressure is so small that the outer mold can be a low strength member, and in case the outer mold is cylindrical in shape, it can be acted on by a shaping roll since the liquid is solidified in sequence.

Figure 2:
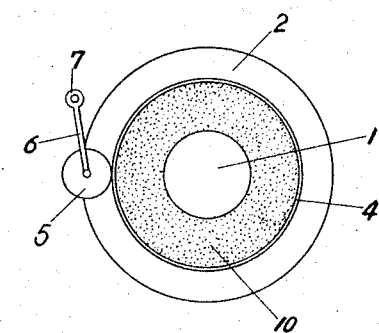
Figure 3:
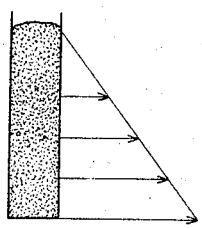
Figure 4:
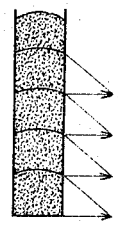
Figure 5:
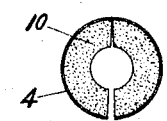

Details of this invention will become apparent from the following description taken together with the accompanying drawings, in which: FIG. 1 is a partial sectional view showing an example of the equipment used in the manufacturing method of this invention; FIG. 2 is a plan view thereof; FIGS. 3 and 4 are the views of the relationship between the pouring height and foaming pressure at the time of pouring and foaming, FIG. 3 being the relationship for a conventional molding process and FIG. 4 being the relationship of the present invention; and FIG. 5 is a plan view of an example of the product obtained by the method of this invention. A core cylinder 1 establishes the inside diameter of the pipe, the product; a rotating disc 2 supports the core cylinder 1; a spacer 3 made of an appropriate doughnut-shape is positioned on the rotating disc 2 and supports the lower end of the outer cylinder 4.

These are driven at an appropriate speed by the drive shaft 8. The spacer 3 can be conveniently made of a resilient material for easy attachment or detachment of the outer cylinder 4, which may preferably be waterproof since it is used as the outer lining material of the product, and at the same time, it functions as a mold. A press roll 5 is fixed at an appropriate position by means of an arm 6 having a fulcrum 7, and shapes and supports the outer lining of the pipe, the product.

Revolution of the outer cylinder is effected by dint of friction with the spacer 3 prior to the pouring of the foaming resin, and, after the said pouring process, the revolution is executed through the friction with the outer surface of the pipe, thereby shaping the said surface of the pipe, the product. A mixing head 9 is provided for mixing and pouring the base fluid of foaming plastic 10.

As can be seen from a comparison of FIGS. 3 and 4, in the conventional pouring method, the pressure builds up continuously. In these figures, the horizontal arrow is a vector representing the foaming pressure, while the vertical direction represents the depth of foam which has been poured. In FIG. 3, where the thickness of the foam in the horizontal direction is 100 mm. and the depth is 600 mm., if pouring and foaming are carried out continuously, the pressure in the lowermost portion can amount to as much as 200 kg./m².

On the other hand, as shown in FIG. 4, because the foaming is substantially complete in one layer before the next layer is poured, the pressure does not build up. Thus, the outer cylinder 4 will be sufficiently strong to withstand the foaming pressure even if it is made of paper, Kent paper, kraft paper, or the like, or plastic sheet material or aluminum foil.

Below, the present invention is described more in detail in reference to the embodiments. It is understood that the present invention by no means is limited and confined to these embodiments.

Embodiment 1

First, tolylenediisocyanate (the mixing ratio 80:20 of isomers: 2-4/2-6), 363 parts by weight, is heated to 60°–70° C. while being stirred in a reaction kettle filled with a nitrogen gas, and 100 parts polyether is added slowly. Then, the reaction temperature is maintained at 90° C., and heating is continued for an hour for reaction. After reaction, it is cooled down to room temperature.

The characteristic properties of the quasi-pre-polymer thus obtained include free NCO 30.1% and viscosity 1300±100 c.p.s. at 20° C.

The prepolymer, thus obtained, is mixed in the following manner, thereby preparing the base fluid of foaming urethane.

| Composition: | Parts in weight |
|---|---|
| Polyether (sorbitol type OH value:500) | 100 |
| Dibutyl tindilaurate | 1.8 |
| Triethylene diamine | 1.0 |
| Silicon oil (L-520, manufactured by Union Carbide Co.) | 0.5 |
| Blowing agent (trichloromonofluomethane) | 40 |
| Prepolymer | 130 |

The time of completion of foaming of the said base fluid is about 30 seconds.

Manufacturing of the pipe

Now, a pipe, 10 cm. in inside diameter, 18 cm. in outside diameter and 60 cm. in length, is manufactured.

First, on the core cylinder 1, 10 cm. in diameter x 70 cm. in length, thin paper, etc., is wound for the purpose of permitting the finished cylinder to be separated from the core cylinder, while the surface of the spacer 3, also, is coated similarly with paper, plastic film, etc.

Then, the outer cylinder 4, 18 cm. in diameter and 70 cm. in length, is mounted on the rotating disc around the spacer 3. The position of the press roll 5 is so regulated and fixed that the thickness of the wall will be 4 cm. Then, by means of the drive shaft 8, the rotating disc is made to revolve, at a revolving speed of 15-20 r.p.m. The foaming plastic base fluid, prepared in the above mentioned manner is poured by means of the mixing head 9 between the core cylinder and outer cylinder at the speed of 0.4-0.3 kg./min.

Pouring is completed in 0.7-1 minute. When the foaming is ended, heating, if necessary, is carried out, and, with the completion of its polymerization, the desired product is obtained. If, again, it is cut as shown in FIG. 5, with paper left behind, it will be very convenient for fitting on an object such as a pipe.

In the method of this invention, a raw material having a relatively quick speed of completion of foaming, is used, and the revolving speed of the rotating disc and the pouring amount are appropriately selected, so that the raw material will have an appropriate gelation for each revolution of the rotating disc. Besides, pouring is effected in appropriate amounts so that the foaming pressure will be properly regulated, and, thus, the foaming pressure generated can be limited.

In general, when fresh fluid is poured on the foam starting to vesicate, some parts of the new fluid penetrate into the lower bubbles, and, after the surface is hardened, the penetrated new fluid starts to vesicate therein. In case the bubbles, thus caused, are in disorder, the foam surface will be destroyed and the bubbles will break.

In the present invention, for the purpose of forestalling such a phenomenon, regulation is effected to such an extent that, when the foam has gelated to a certain extent, the new fluid poured thereon, will not penetrate into the lower bubbles, while pouring may be carried out in a condition where foaming has not been completed, and, thus, a foamed plastic pipe having a uniform foaming can be obtained.

What is claimed is:

1. A method of making a foamed plastic pipe, comprising the steps of providing a core cylinder having a diameter corresponding to the internal diameter of the pipe to be made, a base for said core cylinder having an outside diameter corresponding to the outside diameter of the pipe to be made, positioning said core and base in a vertical position on a horizontal rotating platform, positioning a flexible cylindrical outer mold member around the periphery of said base and coaxial with said core cylinder, placing a rotatable roller having a length as long as the vertical dimension of the outer mold member against one side of said outer mold member, and while rotating said platform for rotating the mold core, base and outer member and causing the rotation of said roller by its contact with the outer mold member, continuously pouring a quick foaming fast curing plastic material into the space between said core and said outer mold member from a fixed point above said space and at a rate which will permit completion of foaming and the top surface of the plastic material to gel before the next portion of plastic material is poured onto it.

2. The method of claim 1 wherein the foamed plastic material is polyurethane resin.

3. The method of claim 1 wherein the foamed plastic material is epoxy resin.

4. The method of claim 1 wherein the outer cylinder is made of paper.

5. The method of claim 1 wherein the outer cylinder is made of plastic sheet.

6. The method of claim 1 wherein the outer cylinder is made of aluminum.

References Cited

UNITED STATES PATENTS

| 2,463,231 | 3/1949 | Wyatt | 264—313 X |
| 2,671,939 | 3/1954 | Everhart et al. | 264—308 X |
| 3,229,441 | 1/1966 | Heffner | 264—45 X |
| 3,242,240 | 3/1966 | Tantlinger | 264—45 |

FOREIGN PATENTS 914,584  1/1963  Great Britain.

ROBERT F. WHITE, *Primary Examiner.*

T. J. CARVIS, *Assistant Examiner.*